US006567749B2

(12) United States Patent
Matsuura

(10) Patent No.: US 6,567,749 B2
(45) Date of Patent: May 20, 2003

(54) VEHICLE CONTROLLING APPARATUS AND METHOD

(75) Inventor: Munenori Matsuura, Tokyo-To (JP)

(73) Assignee: Fuji Jukogyo Kabushiki Kaisha, Tokyo-To (JP)

(*) Notice: Subject to any disclaimer, the term of this patent is extended or adjusted under 35 U.S.C. 154(b) by 0 days.

(21) Appl. No.: 10/126,650

(22) Filed: Apr. 22, 2002

(65) Prior Publication Data

US 2002/0156580 A1 Oct. 24, 2002

(30) Foreign Application Priority Data

Apr. 20, 2001 (JP) ....................... 2001-123110

(51) Int. Cl.[7] ............................. G06F 17/10
(52) U.S. Cl. .................. 701/301; 340/903; 340/435; 340/436; 342/455
(58) Field of Search .................. 701/301; 340/903, 340/904, 435, 436; 180/271; 342/455

(56) References Cited

U.S. PATENT DOCUMENTS

| 5,332,057 A | | 7/1994 | Butsuen et al. | |
|---|---|---|---|---|
| 5,410,346 A | | 4/1995 | Saneyoshi et al. | ........... 348/116 |
| 5,432,509 A | * | 7/1995 | Kajiwara | ..................... 340/903 |
| 5,529,138 A | | 6/1996 | Shaw et al. | |
| 5,540,298 A | | 7/1996 | Yoshioka et al. | |
| 5,646,613 A | * | 7/1997 | Cho | ........................... 340/903 |
| 5,742,917 A | | 4/1998 | Matsuno | ..................... 701/69 |
| 5,983,161 A | * | 11/1999 | Lemelson et al. | ........... 701/301 |
| 6,226,389 B1 | * | 5/2001 | Lemelson et al. | ........... 382/104 |
| 6,275,773 B1 | * | 8/2001 | Lemelson et al. | ........... 701/301 |

FOREIGN PATENT DOCUMENTS

| JP | 7-21500 | 1/1995 |
|---|---|---|
| JP | 8-002274 | 1/1996 |
| JP | 8045000 | 2/1996 |

OTHER PUBLICATIONS

Copy of U.S. patent application Ser. No. 10/126,651, filed on Apr. 22, 2002.

* cited by examiner

Primary Examiner—Gertrude Arthur
(74) Attorney, Agent, or Firm—Smith, Gambrell & Russell

(57) ABSTRACT

An obstacle existing ahead of a vehicle is recognized to detect information on the obstacle. Information on travelling conditions of the vehicle is detected. The steering performance of the vehicle is changed for controlling behaviors of the vehicle. It is determined whether the vehicle can avoid collision with the obstacle only by a driver's braking operation based on at least the information on the obstacle and the vehicle. The vehicle enters into an evasive driving mode in accordance with a driver's steering operation when it is determined that the vehicle cannot avoid collision with the obstacle only by the driver's braking operation. The steering performance of the vehicle is changed for controlling behaviors of the vehicle. A preliminary information is given to the driver to indicate that the vehicle will enter into the evasive driving mode. The driver is then informed that the vehicle has entered into the evasive driving mode.

14 Claims, 5 Drawing Sheets

VEHICLE CONTROLLING APPARATUS AND METHOD

BACKGROUND OF THE INVENTION

The present invention relates to vehicle controlling apparatus and method for taking an evasive action to avoid collision with obstacles appropriately covering vehicle's behaviors before and after the evasive action.

Several types of vehicle controlling apparatus have been developed and put into practical use for enhanced vehicle performance.

The followings are representatives of such vehicle controlling apparatus: a braking-force controller for appropriately applying braking force to wheels against any force exerted on a vehicle, for example, during cornering; a rear-wheel steering controller for controlling rear wheels in accordance with vehicle travelling conditions; a right-to-left torque-split controller for controlling torque split to right and left wheels in accordance with vehicle travelling conditions; and a torque-split controller for torque split between front and rear wheels by controlling differential power of a center differential between the front and rear wheels in accordance with vehicle travelling conditions.

Among other techniques also proposed recently is recognition of any obstacles in front, such as a vehicle travelling ahead, of a driver's vehicle. Japanese Unexamined Patent Publication No. 7-21500, for example, discloses an automatic brake controller. In detail, a driver's steering is always detected. When the driver's vehicle and an obstacle are becoming close and it is determined that the driver's vehicle cannot avoid collision with the obstacle only by usual braking control, the automatic brake controller controls braking force for each wheel for enhanced steering performance, or quick response to the driver's steering.

The known apparatus achieves an appropriate control until the driver takes an evasive action, but not offering various fine controls after the evasive action.

Moreover, the known apparatus achieves high steering performance with automatic braking. It is, however, preferable that high steering performance is achieved by any vehicle controlling apparatus discussed above.

These vehicle controlling apparatus have to operate appropriately in accordance with complex operations such as evasive driving for avoiding an obstacle and then returning to the original position by a short time.

An evasive driving mode under control by such vehicle controlling apparatus has to be informed to a driver on screen or by an alarm. This is because the vehicle control characteristics will vary during the evasive driving mode. The driver could, however, not notice such information while taking an evasive action.

Such an evasive-driving system should have more effective way to inform a driver that a vehicle is going to enter the evasive driving mode and also whether the vehicle control characteristics is different from usual driving due to the evasive driving mode.

SUMMARY OF THE INVENTION

A purpose of the present invention is to provide vehicle controlling apparatus and method for an appropriate evasive action by accurately recognizing obstacles to a vehicle, precisely operating a controlling device for each vehicle behavior, and also effectively informing a driver of vehicle's behaviors during the evasive action.

The present invention provides a vehicle controlling apparatus installed in a vehicle including: an obstacle recognizer to recognize an obstacle existing ahead of the vehicle for detecting information on the obstacle; a vehicle information detector to detect information on travelling conditions of the vehicle; a vehicle controller to change steering performance of the vehicle for controlling behaviors of the vehicle; an evasive-driving determiner to determine whether the vehicle can avoid collision with the obstacle only by a driver's braking operation based on at least the information on the obstacle and the vehicle; an evasive-driving controller to control the vehicle controller to enter into an evasive driving mode in accordance with a driver's steering operation and the vehicle behaviors when it is determined that the vehicle cannot avoid collision with the obstacle only by the driver's braking operation and also control the vehicle controller to change a control operation of the vehicle controller in the evasive driving mode in accordance with the driver's steering operation and the vehicle behaviors; a preliminary informer to give a preliminary information to the driver to indicate that the vehicle controller will enter into the evasive driving mode; and a final informer to inform the driver that the vehicle controller has entered into the evasive driving mode.

Moreover, the present invention provides a vehicle controlling method including the steps of: recognizing an obstacle existing ahead of a vehicle to detect information on the obstacle; detecting information on travelling conditions of the vehicle; changing steering performance of the vehicle for controlling behaviors of the vehicle; determining whether the vehicle can avoid collision with the obstacle only by a driver's braking operation based on at least the information on the obstacle and the vehicle; entering into an evasive driving mode in accordance with a driver's steering operation and the vehicle behaviors when it is determined that the vehicle cannot avoid collision with the obstacle only by the driver's braking operation; changing the steering performance of the vehicle in the evasive driving mode in accordance with the driver's steering operation and the vehicle behaviors; giving a preliminary information to the driver to indicate that the vehicle will enter into the evasive driving mode; and informing the driver that the vehicle has entered into the evasive driving mode.

DETAILED DESCRIPTION OF PREFERRED EMBODIMENTS

A preferred embodiment according to the present invention will be disclosed with reference to the attached drawings.

Figure 1:
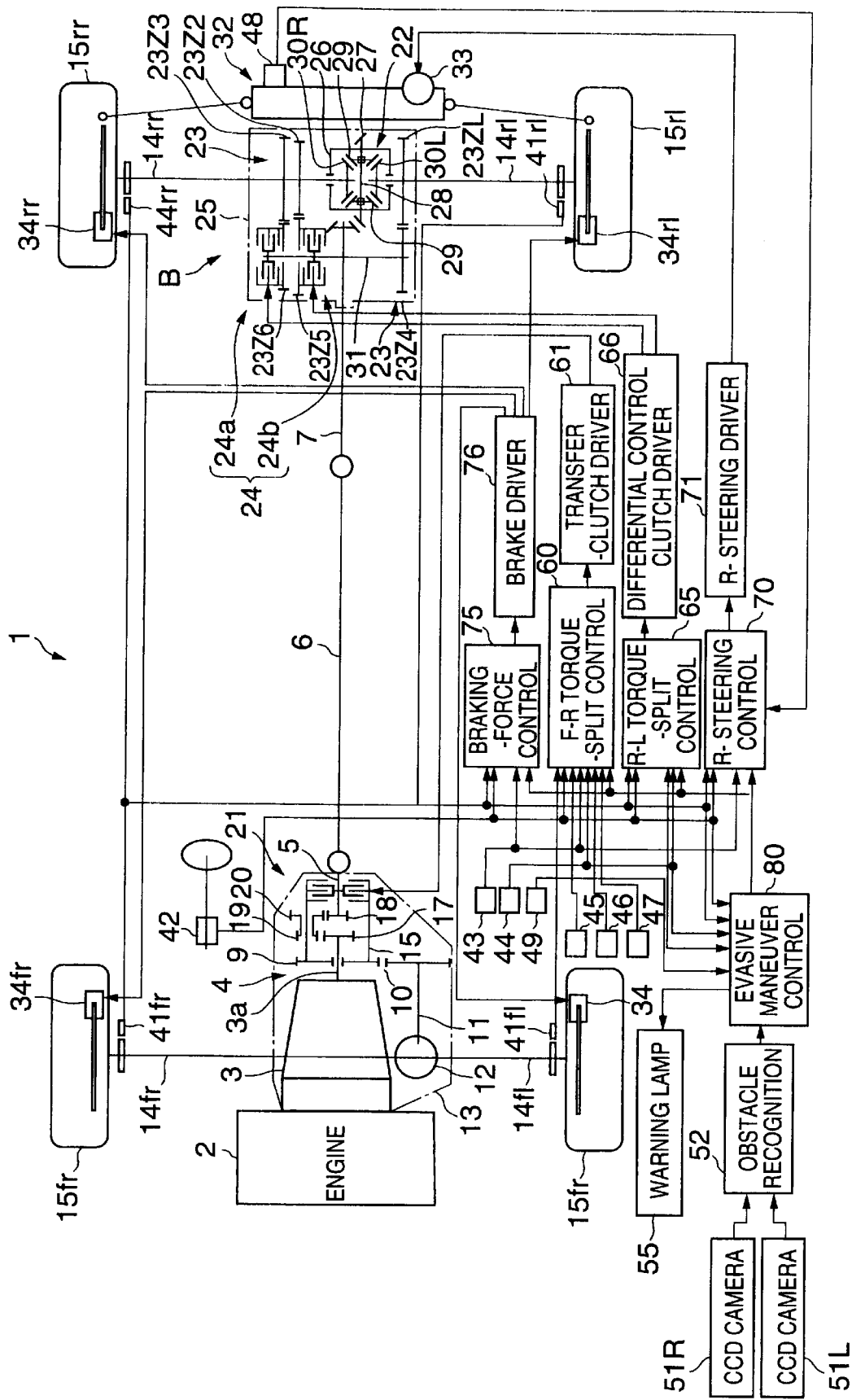
FIG. 1 shows the entire architecture of a vehicle controlling apparatus according to the present invention, installed in a vehicle 1.

FIG. 1 shows the entire architecture of a vehicle controlling apparatus according to the present invention, installed in a vehicle 1.

The vehicle 1 has an engine 2 located at the front. Power from the front engine 2 is transmitted to a center differential 4 via an automatic transmission 3 (including a torque converter, etc) situated behind the engine 2 and a transmission output shaft 3a. The engine driving power is then split to front and rear wheel sides at a specific torque-split ratio.

The torque supplied to the rear wheel side from the center differential 4 is transmitted to a rear-wheel final drive mechanism 8 via a rear drive shaft 5, a propeller shaft 6 and a drive pinion 7.

The torque supplied to the front wheel side from the center differential 4 is transmitted to a front differential 12 via a transfer drive gear 9, transfer driven gear 10, a front drive shaft 11.

The automatic transmission 3, the center differential 4, the front differential 12, etc., are installed in a casing 13.

The torque transmitted to the rear-wheel final drive mechanism 8 is further transmitted to a left rear wheel 15rl via a left rear-wheel drive shaft 14rl, and to a right rear wheel 15rr via a right rear-wheel drive shaft 14rr.

The torque transmitted to the front differential 12 is further transmitted to a left front wheel 15fl via a left front-wheel drive shaft 14fl, and to a right front wheel 15fr via a right front-wheel drive shaft 14fr.

The center differential 4 is located at the back in the housing 13 when viewed from the engine 2. The rotatable transmission output shaft 3a is inserted into the center differential 4 in front of a rotatable carrier 16. Also inserted into the center differential 4 is the rotatable rear drive shaft 5 at the back of the carrier 16.

A large first sun gear 17 is coupled to the transmission output shaft 3a at the rear end. A small second sun gear 18 is coupled to the rear drive shaft 5 at the front end. The first and second sun gears 17 and 18 are installed in the carrier 16.

The first sun gear 17 is meshed with a small first pinion 19 to form a first gear train. The second sun gear 18 is meshed with a large second pinion 20 to form a second gear train. The first and second pinions 19 and 20 are made by integral molding. Several pinion pairs, such as three pairs of pinions of the pinions 19 and 20 are coupled to the carrier 16 so that the pinion pairs can rotate on the carrier 16. The carrier 16 transmits torque to the front wheels via the transfer drive gear 9 coupled to the carrier 16 at the front end.

As disclosed, the center differential 4 is a complex planetary set with no link gears. In this planetary set, torque from the transmission output shaft 3a is transmitted to the first sun gear 17 and supplied to the rear drive shaft 5 via the second sun gear 18, and further to the front drive shaft 11 via the carrier 16, the transfer drive gear 9 and the transfer driven gear 11.

The center differential 4 achieves a specific differential performance with appropriate settings of the number of teeth for each of the sun gears 17 and 18 and the several pinions 19 and 20 provided around the sun gears.

Appropriate gear pitch-diameter settings for engagement between the first sun gear 17 and the first pinion 19, and also second sun gear 18 and the second pinion 20 offer equal (50:50) torque split or unequal torque split to the front and rear wheels, as the standard torque split. This embodiment adopts 36:64 torque split to the front and rear wheels, as the standard torque split.

Moreover, the center differential 4 achieves a specific differential performance with a limited differential torque proportional to an input torque attained with a helical-gear configuration for the first sun gear 17 and the first pinion 19, and also for the second sun gear 18 and the second pinion 20.

In detail, the helical-gear configuration with different pressure angles between the first and second gear trains generates a friction torque between the teeth of first and second pinions 19 and 20 with residual thrust load. The helical-gear configuration also generates a friction torque on the pinions 19 and 20 and also the carrier 16 that supports these pinions with a combination of load applied to the sun gears and the pinions due to engagement and disengagement.

A transfer clutch 21, a multiple-hydraulic disc clutch, is provided between the carrier 16 and the rear drive shaft 5, for varying the torque split between the front and rear wheels. The engagement of the transfer clutch 21 is controlled so that the torque split can be varied in the range from 50:50 torque split (4WD) to a torque split ratio attained by the center differential 4.

The transfer clutch 21 is connected to a transfer-clutch driver 61 having a hydraulic circuit with several solenoid valves. The transfer-clutch driver 61 generates hydraulic pressure for engagement and disengagement of the transfer clutch 21, in response to a control signal (to each solenoid valve) from a front-rear torque-split controller 60 (described later).

The rear-wheel final drive mechanism 8 has the differential function and torque splitting function between the right and left wheels. It mainly consists of a bevel-gear differential mechanism 22, a gear mechanism 23 having three gear trains, and two clutch mechanisms 24 (24a, 24b) for torque split between the right and left wheels. All of these mechanisms are installed in a differential carrier 25.

The drive pinion 7 is meshed with a final gear 27 provided outside a differential casing 26 of the differential mechanism 22. It transmits the torque to the final gear 27, which is split to the rear-wheel side from the center differential 4.

The differential mechanism 22 includes a differential pinion (bevel gear) 29 and right and left side gears (bevel gears) 30R and 30L meshed with the pinion 29, installed in the differential casing 26. The differential pinion 29 is coupled to a pinion shaft 28 so that it can rotate on the shaft 28. The pinion shaft 28 is fixed to the differential casing 26. The right and left side gears 30R and 30L are coupled to the right and left rear drive shafts 14rr and 14rl, respectively, at their shaft ends in the differential casing 26.

Rotation of the drive pinion 7 allows the differential casing 26 to rotate about the shaft of the side gears 30L and 30R so that the gear mechanisms in the casing 26 can perform the differential function to the right and left wheels.

The gear mechanism 23 has two right and left sections between which the differential mechanism 22 is interposed. In detail, a first gear 23z1 is coupled to the left rear-wheel drive shaft 14rl whereas a second gear 23z2 and a third gear 23z3 are coupled to the right rear-wheel drive shaft 14rr. These gears 23z1, 23z2 and 23z3 are arranged on the same rotary shaft and meshed with a fourth gear 23z4, a fifth gear 23z5 and a sixth gear 23z6, respectively, arranged on another same rotary shaft. The fourth gear 23z4 is coupled to a torque bypass shaft 31 at the left rear-wheel side, the shaft 31 being provided along the other rotary shaft.

Provided at the right rear-wheel side of the torque bypass shaft 31 is a first differential control clutch 24a, the one of the clutch mechanisms 24 for right-left torque split. The torque bypass shaft 31 can be coupled to the shaft of the sixth gear 23z6 via the differential control clutch 24a. The clutch 24a is provided at the right rear-wheel of the sixth gear 23z6. The coupling of the torque bypass shaft 31 to the sixth gear 23z6 is achieved when the former is provided at the clutch-hub side whereas the latter the clutch-drum side.

Provided along the torque bypass shaft 31 but between the differential mechanism 22 and the fifth gear 23z5 is a second differential control clutch 24b, the other clutch mechanism 24 for right-left torque split. The torque bypass shaft 31 can be coupled to the shaft of the fifth gear 23z5 via the differential control clutch 24b. The clutch 24b is provided at the left rear-wheel side of the fifth gear 23z5. The coupling of the torque bypass shaft 31 to the fifth gear 23z5 is achieved when the former is provided at the clutch-hub side whereas the latter the clutch-drum side.

The number of teeth z1, z2, z3, z4, z5 and z6 for the gears 23z1, 23z2, 23z3, 23z4, 23z5 and 23z6 are, for example, 82, 78, 86, 46, 50 and 42, respectively. The gear train (z5/z2= 0.64) of the second and fifth gears 23z2 and 23z5 is used for acceleration whereas the gear train (z6/z3=0.49) of the third and sixth gears 23z3 and 23z6 is used for deceleration in relation to the gear train (z4/z1=0.56) of the first and fourth gears 23z1 and 23z4.

Disengagement of both differential control clutches 24a and 24b offers equal torque split to the rear right and left drive shafts 14rr and 14rl via the differential mechanism 22 from the drive pinion 7.

Engagement of the differential control clutch 24a offers a large torque to the left rear wheel 15rl for high steering performance in turning right on the normal road μ. This is because a component of the torque split to the right rear drive shaft 14rr is returned to the differential casing 26 via the gear 23z3, the gear 23z6, the differential control clutch 24a, the torque bypass shaft 31, the gear 23z4 and the gear 23z1 in order.

On the contrary, engagement of the differential control clutch 24b offers a large torque to the right rear wheel 15rr for high steering performance in turning left on the normal road μ. This is because a component of the torque transmitted to the differential casing 26 from the drive pinion 7 is bypassed to the right rear drive shaft 14rr via the gear 23z1, the gear 23z4, the torque bypass shaft 31, the differential control clutch 24b, the gear 23z5 and the gear 23z2 in order.

The differential control clutches 24a and 24b is connected to a differential control clutch driver 66 having a hydraulic circuit with several solenoid valves. The differential control clutch driver 66 generates hydraulic pressure for engagement and disengagement of the differential control clutches 24a and 24b, in response to a control signal (to each solenoid valve) from a right-left torque-split controller 65 (described later).

A rear-wheel steering mechanism 32 has a rear-wheel steering motor 33 which is driven by a rear-wheel steering driver 71 controlled by a rear-wheel steering controller 70. Power generated by the motor 33 is transmitted via a worm-to-worm wheel link mechanism to steer the right and left wheels 15rr and 15rl.

Connected to a brake controller 76 is a master cylinder (not shown) connected to a brake pedal. When a driver presses the brake pedal, force is transmitted via the brake driver 76 to a left front-wheel cylinder 34fl, a right front-wheel cylinder 34fr, a left rear-wheel cylinder 34rl and a right rear-wheel cylinder 34rr for the left front wheel 15fl, the right front wheel 15fr, the left rear wheel 15rl and the right rear wheel 15rr, respectively, to apply the brakes to the four wheel.

The brake controller 76 is a hydraulic unit having a brake fluid reservoir, a decompression valve, a compression valve, etc. No only by the driver's operation, but also in response to a signal from a braking force controller 75, the brake controller 76 can apply the brakes to the wheel cylinders 34fl, 34fr, 34rl and 34rr individually.

The front-rear torque-split controller 60, the right-left torque-split controller 65, the rear-wheel steering controller 70 and the braking force controller 75 are installed in the vehicle 1 as vehicle controllers. Also installed in the vehicle 1 is an evasive maneuver controller 80 that sends signals to the controllers 60, 65, 70 and 75.

Furthermore, the vehicle 1 is equipped with several sensors and switches as vehicle condition detectors for detecting vehicle's behaviors.

In detail, wheel speeds for the left front wheel 15fl, the right front wheel 15fr, the left rear wheel 15rl and the right rear wheel 15rr are detected by wheel-speed sensors 41fl, 41fr, 41rl and 41rr, respectively. The detected wheel-speed data are processed to obtain a vehicle speed V which is then supplied to the front-rear torque-split controller 60, the right-left torque-split controller 65, the rear-wheel steering controller 70, the braking force controller 75 and the evasive maneuver controller 80.

A steering angle θH and a yaw rate γ detected by a steering angle sensor 42 and a yaw rate sensor 43, respectively, are also supplied to the front-rear torque-split controller 60, the right-left torque-split controller 65, the rear-wheel steering controller 70, the braking force controller 75 and the evasive maneuver controller 80.

A lateral acceleration Gy detected by a lateral acceleration sensor 44 is supplied to the front-rear torque-split controller 60, the right-left torque-split controller 65 and the evasive maneuver controller 80.

Also supplied to the front-rear torque-split controller 60 are a throttle opening θth detected by a throttle opening sensor 45, a gear position detected by an inhibitor switch 46 and an engine speed Ne detected by an engine speed sensor 47.

A rear-wheel steering angle δr detected by a rear-wheel steering angle detector 48 is supplied to the rear-wheel steering controller 70.

A front-rear acceleration Gx detected by a front-rear acceleration sensor 49 is supplied to the evasive maneuver controller 80.

Incorporated into an instrument panel of the vehicle 1 is a warning lamp 55 that is flashes for warning a driver of a possibility of entering into an evasive driving mode and also turned on during evasive driving, controlled by the evasive maneuver controller 80.

The vehicle 1 is equipped with stereo optical equipment having a pair of CCD cameras using charge-coupled devices, a left-side camera 51L and a right-side camera 51R. The two cameras are arranged on the ceiling of the vehicle 1 at the front side with a specific distance for taking stereo images of objects existing outside the vehicle.

Image signals from the CCD cameras 51L and 51R are supplied to an obstacle recognition unit 52. The unit 52 obtains three-dimensional distance distribution data over the images based on parallax to the same object using a triangular surveying principle. The three-dimensional distance distribution data are processed for detection of the road shapes and several three-dimensional objects to recognize any obstacle existing ahead, such as a vehicle travelling ahead.

The CCD cameras 51L and 51R and the obstacle recognition unit 52 constitute an obstacle recognizer.

The obstacle recognition unit 52 searches for identical objects per minute area on the pair of stereo images taken by the CCD cameras 51L and 51R and calculates the distance to the object based on displacement between the identical objects to obtain distance distribution data (distance image) like an image. The distance distribution data are stored and processed for detection of the road shapes and several three-dimensional objects to recognize any obstacle existing ahead.

In a road detection procedure, the obstacle recognition unit 52 extracts lane-marker data on a real road from three-dimensional positional data on the stored distance image. The extracted data are used for modifying or altering road-model parameters installed in the unit 52 so that they will match an actual road shape for road-shape and lane recognition.

In an object detection procedure, the obstacle recognition unit 52 divides the distance image into grid-like segments and selects data on three-dimensional objects which may become an obstacle to driving for each segment, to calculate the distance to the objects. The objects are identified as the same object if the difference in distance to the objects on adjacent segments is equal to or smaller than a predetermined value. On the contrary, they are identified as different objects if the difference is larger than the predetermined value. An outline image of the object(s), the obstacle, is then obtained.

The above procedures, such as generation of distance image and detection of road shapes and objects are disclosed in detail in Japanese Unexamined Patent Publications Nos. 5-265547 and 6-177236.

Data on an obstacle existing ahead, such as a distance Ls to the obstacle (vehicle travelling ahead), a speed Vs of the obstacle (vehicle travelling ahead) and deceleration as of the obstacle (vehicle travelling ahead) detected by the obstacle recognition unit 52 are supplied to the evasive maneuver controller 80.

Disclosed next is each vehicle controller for controlling vehicle's behaviors.

As disclosed detail in Japanese Unexamined Patent Publications No. 8-2274, the front-rear torque-split controller 60 estimates cornering power for the front and rear wheels over the linear and non-linear ranges by using a dynamic equation for the vehicle's lateral motion with the detected vehicle speed V, steering angle θH and actual yaw rate γ.

Also estimated by the front-rear torque-split controller 60 is a road friction coefficient $\mu$ based on a ratio of the estimated cornering power for the front and rear wheels to that for the equivalent cornering power for the front and rear wheels on a high-$\mu$ road.

The front-rear torque-split controller 60 looks up a pre-installed map to the estimated road friction coefficient $\mu$ for obtaining a base clutch torque VTDout0.

The clutch torque VTDout0 is corrected based on the following values: an input torque Ti (calculated by using engine speed Ne and gear ratio i) supplied to the center differential 3; a deviation of the actual yaw rate γ from a target yaw rate γt (yaw-rate deviation Δγ=γ−γt), the target γt being calculated by using the throttle opening θth, an actual yaw rate γ and a vehicle speed V; and lateral acceleration Gy.

The corrected clutch torque VTDout0 is used for calculating a control output torque VTDout, the base of a base clutch engagement force FOtb for front-rear torque splitting.

The control output torque VTDout is corrected by using a steering-wheel angle θ to become the base clutch engagement force FOtb as a steering-wheel responsive clutch torque for the transfer clutch 21.

The front-rear torque-split controller 60 supplies a signal corresponding to the base clutch engagement force FOtb, to the transfer-clutch driver 61. The clutch driver 61 applies a clutch oil pressure to the transfer clutch 21 to operate for front-rear torque splitting as differential force to the center differential 3.

The correction of the base clutch torque VTDout0 using the yaw-rate deviation Δγ is to increase or decrease the clutch torque in accordance with a deviation of the actual yaw rate γ from the target yaw rate γt expected to be generated during steering, for avoiding the tendency of oversteering or understeering.

The base clutch torque VTDout0 is corrected by, for example, decreasing the clutch torque to apply a larger torque to the rear wheels than the front wheels to achieve high steering performance. This correction is performed when it is expected that the target yaw rate γt (absolute value) will be larger than the actual yaw rate γ (absolute value), thus causing the tendency of understeering.

Contrary to this, the base clutch torque VTDout0 is corrected by increasing the clutch torque to have equal torque split to the front and rear wheels to achieve high stability. This correction is performed when it is expected that the target yaw rate γt (absolute value) will be smaller than the actual yaw rate γ (absolute value), thus causing the tendency of oversteering.

Also supplied to the front-rear torque-split controller 60 are control signals for enhanced steering performance and enhanced stability from the evasive maneuver controller 80.

In detail, in response to the control signal for enhanced steering performance, the front-rear torque-split controller 60 multiplies the calculated target yaw rate γt (absolute value) by a coefficient larger than 1 to correct the target yaw rate γt as being larger than a usual value. This correction decreases the clutch torque to apply a larger torque to the rear wheels than the front wheels to achieve high steering performance.

On the contrary, in response to the control signal for enhanced stability, the front-rear torque-split controller 60 multiplies the calculated target yaw rate γt (absolute value) by a coefficient smaller than 1 to correct the target yaw rate γt as being smaller than the usual value. This correction increases the clutch torque to have equal torque split to the front and rear wheels to achieve high stability.

The right-left torque-split controller 65 calculates a clutch torque in accordance with ground weight between the right and left wheels based on the vehicle speed V, steering angel θH and lateral acceleration Gy. The calculated clutch torque is corrected by using the deviation of the actual yaw rate γ from the target yaw rate γt calculated by using the vehicle speed V and the steering angel θH. The right-left torque-split controller 65 then controls the differential control clutch driver 66 to drive the first differential control clutch 24a or the second differential control clutch 24b to generate the finally corrected clutch torque for torque splitting between the right and left wheels.

The correction of clutch torque using the yaw-rate deviation Δγ at the right-left torque-split controller 65 is also to increase or decrease the clutch torque in accordance with the deviation of the actual yaw rate γ from the target yaw rate γt expected to be generated during steering, for avoiding the tendency of oversteering or understeering.

In detail, the clutch torque is corrected to apply a larger torque, for example, to the left wheels than the right wheels in turning right to achieve high steering performance. This correction is performed when it is expected that the target yaw rate γt (absolute value) will be larger than the actual yaw rate γ (absolute value), thus causing the tendency of understeering.

Contrary to this, the clutch torque is corrected to apply a smaller torque, for example, to the left wheels than the right wheels in turning right to achieve high stability. This correction is performed when it is expected that the target yaw rate γt (absolute value) will be smaller than the actual yaw rate γ (absolute value), thus causing the tendency of oversteering.

Also supplied to the right-left torque-split controller 65 are control signals for enhanced steering performance and enhanced stability from the evasive maneuver controller 80.

In detail, in response to the control signal for enhanced steering performance, the right-left torque-split controller 65 multiplies the calculated target yaw rate γt (absolute value) by a coefficient larger than 1 to correct the target yaw rate γt as being larger than a usual value. This correction increases the torque to be applied, for example, to the left wheels compared to the right wheels in turning right to achieve high steering performance.

On the contrary, in response to the control signal for stability, the right-left torque-split controller 65 multiplies the calculated target yaw rate γt (absolute value) by a coefficient smaller than 1 to correct the target yaw rate γt as being smaller than the usual value. This correction decreases the torque to be applied, for example, to the left wheels compared to the right wheels in turning right to achieve high stability.

The rear-wheel steering controller 70 calculates a target rear-wheel steering angle δr' based on a specific control protocol using the vehicle speed V, steering angle θf and yaw rate γ. The target rear-wheel steering angle δr' is compared with the current rear-wheel steering angle δr to determine a required rear-wheel steering amount. The rear-wheel steering controller 70 then supplies a signal corresponding to the required rear-wheel steering amount to the rear-wheel steering driver 71 to drive the rear-wheel steering motor 33.

Moreover, in response to a control signal from the evasive maneuver controller 80, the rear-wheel steering controller 70 performs correction to have a large in-phase steering amount for the rear-wheel steering angle in relation to a front-wheel steering angle and yaw rate.

The controlling procedure performed by the rear-wheel steering controller 70 is further disclosed in detail.

The control protocol installed in the rear-wheel steering controller 70 is a control protocol with negative-phase steering angle and in-phase yaw rate, as given by the following equation (1):

$$\delta r' = -K\delta 0 \cdot f1 \cdot (\theta H/N) + K\gamma 0 \cdot f2 \cdot \gamma \quad (1)$$

where Kδ0 is a steering-angle responsive gain, Kγ0 is a yaw-rate responsive gain and N is a steering gear ratio.

The yaw-rate responsive gain Kγ0 is a coefficient for determining the rear-wheel steering amount for decrease in yaw rate γ. The steering-angle responsive gain Kδ0 is a coefficient for determining the rear-wheel steering amount for enhanced steering performance.

In detail, the yaw-rate responsive gain Kγ0 is given for steering the rear wheels in phase to the yaw rate γ. The larger the yaw-rate responsive gain Kγ0, the more a vehicle travels obliquely from the vehicle's longitudinal axis without turning, thus avoiding generation of yaw rate γ. In other words, the steering performance will be lowered for enhanced stability. As discussed, the yaw-rate responsive gain Kγ0 can be used as a coefficient for determining the amount of steering to the rear wheels in relation to a generated yaw rate γ, for prevention of yaw-rate generation.

Application of the yaw-rate responsive gain Kγ0 only, however, cannot give turning capability to a vehicle. In other words, the steering-angle responsive gain Kδ0 is given for the turning capability. The steering performance will be improved by steering the rear wheels in negative phase to the steering angle θH.

In detail, a vehicle can turn to right or left with a steering-angle responsive gain Kδ0 larger than a steering angle θH. On completion of turning, the rear wheels are steered in a direction of canceling the yaw rate γ (, or a direction of canceling side-to-side wobbling). This is because gear change to the neutral position gives the yaw-rate responsive gain Kγ0 only to the control protocol.

The steering-angle responsive gain Kδ0 will not vary while the vehicle speed is higher than a specific speed because it is calculated based on cornering power for the front and rear wheels. The steering-angle responsive gain Kδ0 is set at a small value while the vehicle speed is almost zero so that the rear wheels will not allowed to be steered while the vehicle is almost stationary.

In response to the control signals from the evasive maneuver controller 80, the rear-wheel steering controller 70 corrects the steering-angle responsive gain Kδ0 by multiplying it by a rear-wheel steering-angle correction offset f1, and also corrects the yaw-rate responsive gain Kγ0 by multiplying it by a rear-wheel steering-angle correction offset f2.

The steering-angle responsive gain Kδ0 is multiplied by a rear-wheel steering-angle correction offset f1 larger than 1 to have a large absolute vale. This large absolute vale of gain Kδ0 allows the rear wheels to be steered in negative phase to the steering angle θH compared to a normal driving for enhanced steering performance.

On the contrary, the steering-angle responsive gain Kδ0 is multiplied by a rear-wheel steering-angle correction offset f1 smaller than 1 to have a small absolute vale. This small absolute vale of gain Kδ0 does not allow the rear wheels to be steered in negative phase to the steering angle θH compared to a normal driving for detracted steering performance but enhanced stability.

The yaw-rate responsive gain Kγ0 is multiplied by a rear-wheel steering-angle correction offset f2 smaller than 1 to be corrected as being smaller than a normal value in phase to the yaw rate γ for the rear wheels for enhanced steering performance.

On the contrary, the yaw-rate responsive gain Kγ0 is multiplied by a rear-wheel steering-angle correction offset f2 larger than 1 to be corrected as being larger than the normal value in phase to the yaw rate γ for the rear wheels for detracted steering performance but enhanced stability.

The advantages discussed above can be given by the correction of at least either the steering-angle responsive gain Kδ0 or the yaw-rate responsive gain Kγ0.

The braking force controller 75 calculates a braking force based on the actual yaw rate γ and the target yaw rate γt obtained by using the vehicle speed V and steering angle θH. The braking force is then applied to a selected wheel via the brake controller 76 for generating an appropriate yaw moment to the wheel.

In detail, the braking force is applied, for example, to the right rear wheel in turning right against understeering in which the target yaw rate γt (absolute value) is larger than the actual yaw rate γ (absolute value), for enhanced steering performance.

On the contrary, the braking force is applied, for example, to the left front wheel in turning right against oversteering in which the target yaw rate γt (absolute value) is smaller than the actual yaw rate γ (absolute value), for enhanced stability.

In detail, in response to the control signal for enhanced steering performance from the evasive maneuver controller 80, the braking force controller 75 multiplies the calculated target yaw rate γt (absolute value) by a coefficient larger than 1 to correct the target yaw rate γt as being larger than a usual value.

On the contrary, in response to the control signal for enhanced stability from the evasive maneuver controller 80, the braking force controller 75 multiplies the calculated target yaw rate γt (absolute value) by a coefficient smaller than 1 to correct the target yaw rate γt as being smaller than the usual value.

Disclosed next in detail is the evasive maneuver controller 80.

Data supplied to the evasive maneuver controller 80 are the vehicle speed V, steering angle θH, yaw rate γ, longitudinal acceleration Gx as information on travelling conditions of the the vehicle 1. Also supplied to the evasive maneuver controller 80 are information on the obstacle (vehicle travelling ahead) such as a distance Ls to the obstacle (vehicle travelling ahead), a speed Vs of the obstacle (vehicle travelling ahead) and deceleration αs of the obstacle (vehicle travelling ahead), from the obstacle recognition unit 52.

The evasive maneuver controller 80 determines whether the driver can avoid collision with the obstacle only by a braking operation based on the information on the vehicle 1 and the obstacle and also road conditions estimated by calculation.

If it is determined that the driver cannot avoid collision with the obstacle only by the braking operation, the evasive maneuver controller 80 enters into an evasive driving mode in accordance with steering operations and behaviors of the vehicle 1.

The evasive maneuver controller 80 then supplies several control signals to the front-rear torque-split controller 60, the right-left torque-split controller 65, the rear-wheel steering controller 70 and the braking force controller 75. In response to the control signals, each vehicle controller alters its control characteristics for enhanced steering performance and/or stability. During the evasive driving mode, the evasive maneuver controller 80 varies the control signals for altering the control characteristics of the vehicle controllers for evasive driving in accordance with steering operations and vehicle behaviors.

Moreover, before entering into the evasive driving mode, the evasive maneuver controller 80 supplies a preliminary warning signal to the warning lamp 55 that will flash to warn the driver of a possibility of entering into this mode. Moreover, once entered into the evasive driving mode, the controller 80 supplies a final warning signal to the warning lamp 55 that will be turned on to inform the driver that the vehicle 1 has entered into the evasive driving mode.

Figure 2:
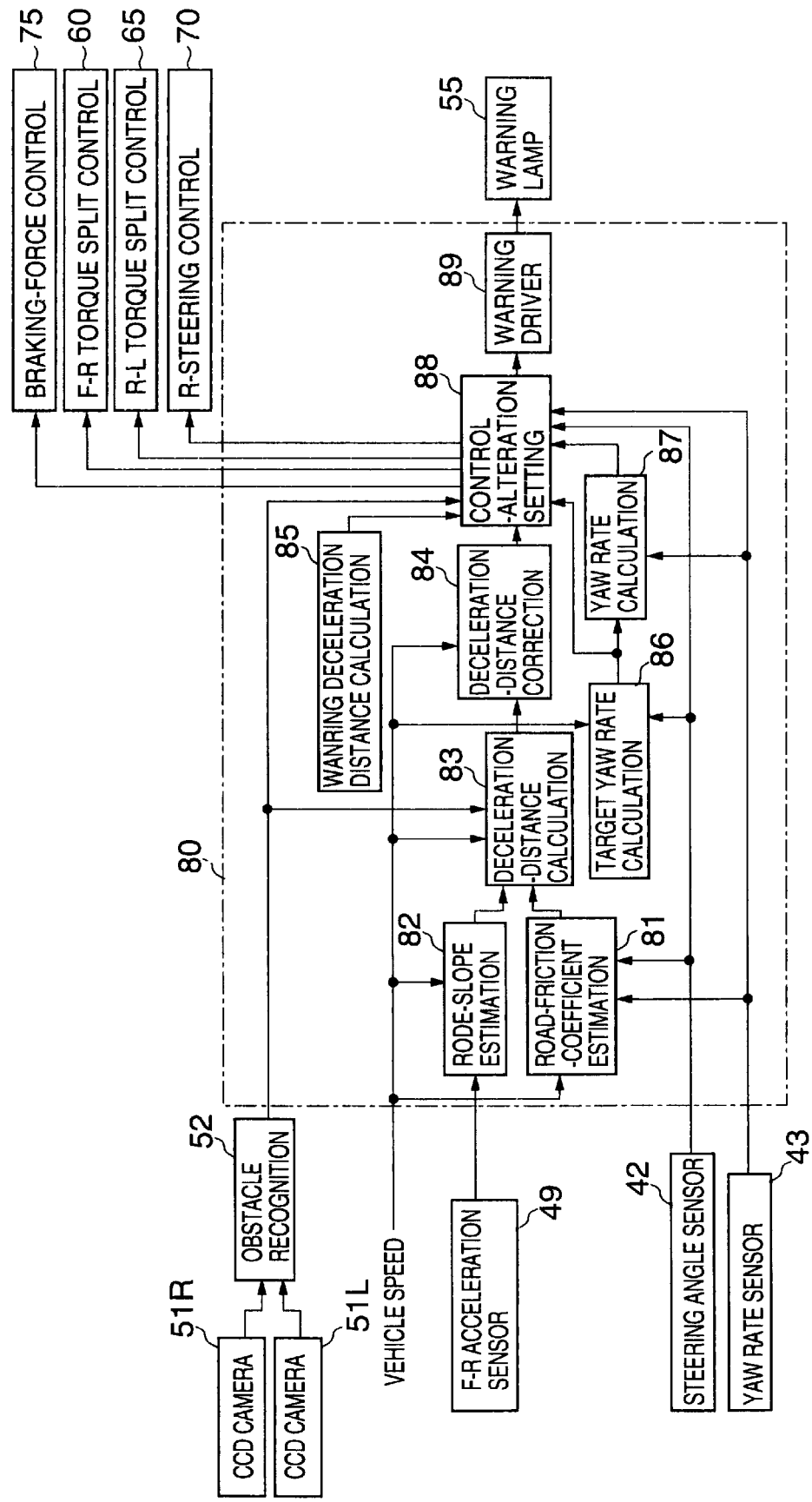
FIG. 2 shows a functional block diagram of an evasive-driving controller of the vehicle controlling apparatus according to the present invention.

As shown in FIG. 2, the evasive maneuver controller 80 mainly consists of a road friction-coefficient estimation unit 81, a road-slope estimation unit 82, a deceleration-distance calculation unit 83, a deceleration-distance correction unit 84, a warning deceleration-distance calculation unit 85, a target yaw rate calculation unit 86, a yaw rate deviation calculation unit 87, a control-alteration setting unit 88 and a warning drive unit 89.

The road friction-coefficient estimation unit 81 estimates cornering power for the front and rear wheels over the linear and non-linear ranges by using a dynamic equation for the vehicle's lateral motion with the detected vehicle speed V, steering angle θH and actual yaw rate γ.

Moreover, the road friction-coefficient estimation unit 81 estimates a road friction coefficient μ based on a ratio of the estimated cornering power for the front and rear wheels to the equivalent cornering power for the front and rear wheels on a high-μ road. The estimated road friction coefficient μ is supplied to the deceleration-distance calculation unit 83.

The road-slope estimation unit 82 receives the vehicle speed V and longitudinal acceleration Gx and calculates a rate of change RC (m/s$^2$) in vehicle speed V per set period. It also calculates a slope of road SL (%) by using the following equation (2) with the vehicle speed V and longitudinal acceleration Gx:

$$SL = (Gx - RC/g) \cdot 100 \quad (2)$$

where "g" is acceleration of gravity (m/s$^2$) and a resultant (+) will indicate a direction of ascent for the slope.

Not only that, the slope of road SL may be calculated by the following equation (3):

$$SL = \tan(\sin^{-1}((((ER \cdot TCR \cdot TGR \cdot FGR/m) - N)VM - RC)/g)) \cdot 100 \neq (((ER \cdot TCR \cdot TGR \cdot FGR/m - N)VM - RC)/g)) \cdot 100 \quad (3)$$

wherein ER is an engine torque (N-m), TCR is a torque ratio for a torque converter in automatic transmission, TGR is a transmission gear ratio, FGR is a final gear ratio, "m" is a wheel radius, N is a running resistance, and VM is a vehicle mass (Kg).

As disclosed, the road friction coefficient μ and the slope of road SL are estimated by the road friction-coefficient estimation unit 81 and the road-slope estimation unit 82, respectively, the estimation units 81 and 82 being provided as a road-surface estimator.

The deceleration-distance calculation unit 83 receives the vehicle speed V, speed Vs of the obstacle (vehicle travelling ahead) and deceleration αs (m/s$^2$) of the obstacle (vehicle travelling ahead). Also supplied to the deceleration-distance calculation unit 83 is the slope of road SL from the road-slope estimation unit 82.

The deceleration-distance calculation unit 83 calculates a required deceleration distance LGB based on these data under consideration of relative movement between the vehicle 1 and the obstacle (vehicle travelling ahead). The deceleration distance LGB is the least distance for avoiding collision with the obstacle by driver's braking operation only, which is obtained by the following equation:

$$LGB = \tfrac{1}{2} \cdot (V - Vs)^2 / ((\mu - SL/100) \cdot g - \alpha s) \quad (4)$$

The deceleration-distance correction unit 84 receives the vehicle speed V, speed Vs of the obstacle (vehicle travelling ahead) and deceleration αs (m/s$^2$) of the obstacle (vehicle travelling ahead). Using the vehicle speed V, the deceleration-distance correction unit 84 calculates deceleration α (m/s$^2$) of the vehicle 1.

Then, the deceleration-distance correction unit 84 corrects the required deceleration distance LGB according to the following equation (5) under consideration of delay in driver's braking operation:

$$LGB = LGB + (V - Vs) \cdot Ttd(s) + \tfrac{1}{2} (\alpha s - \alpha) \cdot Ttd(s)^2 \quad (5)$$

where Ttd(s) is a preset delay time for driver's braking operation.

The corrected deceleration distance LGB is supplied to the warning deceleration-distance calculation unit 85 and the control-alteration setting unit 88.

On receiving the corrected deceleration distance LGB, the warning deceleration-distance calculation unit 85 multiplies it by a value larger than 1 to calculate a warning deceleration distance Lwg which is then supplied to the control-alteration setting unit 88.

The value larger than 1 may be a constant, for example 1.1, obtained by experiments. The warning deceleration distance Lwg obtained by multiplying LGB by the constant requires the least value. Or, it may be set as a variable on a map using the vehicle speed, etc. The warning deceleration distance Lwg obtained by multiplying LGB by the constant or the variable requires to be set as a distance for giving enough time to inform the driver of a possibility of entering into the evasive driving mode.

The target yaw rate calculation unit 86 receives the vehicle speed V and steering angle θH to calculate a target yaw rate γt.

The target yaw rate γt is given by the following equation (6), like the calculation, for example, at the front-rear torque-split controller 60, the right-left torque-split controller 65 and the braking force controller 75:

$$\gamma t = 1/(1+T \cdot S) \cdot \gamma t0 \quad (6)$$

where S is the Laplace transform operator, T is the first-order delay constant and γt0 is a constant target yaw rate γt0.

The first-order delay constant T is given by the following equation (7):

$$T = (m \cdot Lf \cdot V)/(2 \cdot L \cdot Kr) \quad (7)$$

where m is vehicle mass, L is a wheelbase, Lf is a distance between the front axle and the center of gravity of the vehicle 1, and Kr is the equivalent rear cornering power.

The constant target yaw rate γt0 is given by the following equation (8):

$$\gamma t0 = G\gamma\delta \cdot (\theta H//n) \quad (8)$$

where "n" is a steering-gear ratio and Gγδ is a yaw-rate gain.

The yaw-rate gain Gγδ is given by the following equation (9):

$$G\gamma\delta = 1/(1+A \cdot V^2) \cdot (V/L) \quad (9)$$

where A is a stability factor decided according to the performance of the vehicle 1.

The stability factor A is given by the following equation (10):

$$A = -(m/(2 \cdot L^2)) \cdot (Lf \cdot Kf - Lr \cdot Kr)/(Kf \cdot Kr) \quad (10)$$

where Lr is a distance between the rear axle and the center of gravity of the vehicle 1, and Kf is the equivalent front cornering power.

On receiving the actual yaw rate γ and the target yaw rate γt from the yaw rate sensor 43 and the target yaw rate calculation unit 85, respectively, the yaw rate deviation calculation unit 86 calculates a yaw rate deviation Δγ according to the following equation (11):

$$\Delta\gamma = \gamma - \gamma t \quad (11)$$

Supplied to the control-alteration setting unit 88 are the steering angle θH, actual yaw rate γ and the distance Ls to the obstacle (vehicle travelling ahead), and also the required deceleration distance LGB from the deceleration-distance correction unit 84, the warning deceleration distance Lwg from the warning deceleration-distance calculation unit 85, the target yaw rate γt from the target yaw rate calculation unit 86 and the yaw rate deviation Δγ from the yaw rate deviation calculation unit 87.

The control-alteration setting unit 88 determines whether to enter into the evasive driving mode and further supplies signals for enhanced steering performance (a first mode) and signals for enhanced stability (a second mode) to the vehicle controllers 60, 65, 70 and 75 when the vehicle 1 has entered into the evasive driving mode or signals for refraining from the evasive driving mode to these vehicle controllers.

Moreover, the control-alteration setting unit 88 compares the warning deceleration distance Lwg and the distance Ls to the obstacle (vehicle travelling ahead) and supplies a lamp-flashing signal, or a preliminary warning signal to the warning drive unit 89 when the distance Ls is equal to or shorter than the distance Lwg. And, on entering into the evasive driving mode, the control-alteration setting unit 88 supplies a lamp turn-on signal, or a final warning signal to the warning drive unit 89. The warning drive unit 89 then drives the warning lamp 55 so that it can flash or be turned on.

As disclosed, the deceleration-distance calculation unit 83, the deceleration-distance correction unit 84 and the control-alteration setting unit 88 constitute an evasive driving determiner. The control-alteration setting unit 88 also acts as an evasive driving controller. The warning lamp 55, the control-alteration setting unit 88 and the warning drive unit 89 constitute a preliminary informer and also a final informer.

Figure 3:
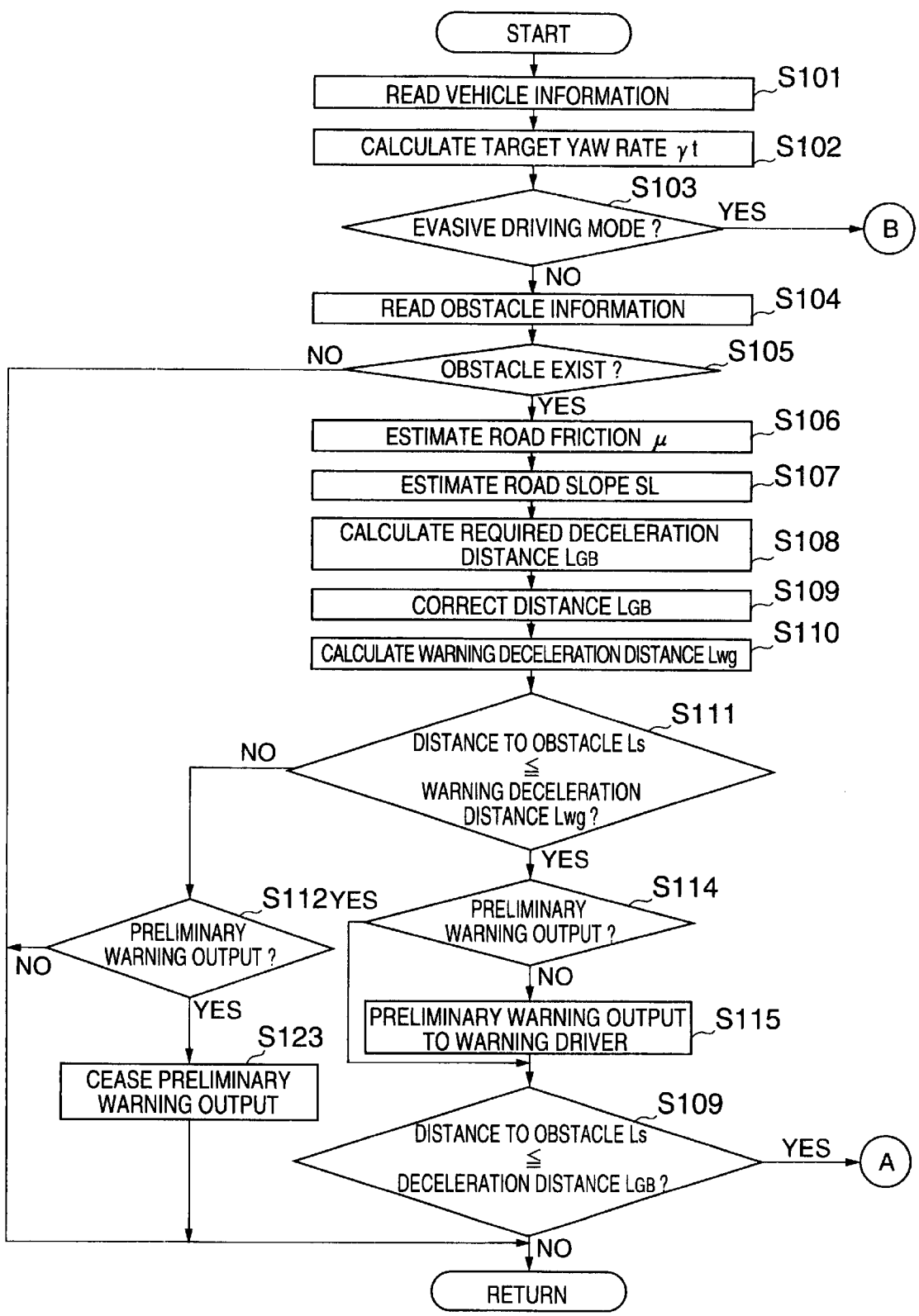
FIG. 3 shows a flowchart of an evasive-driving control program according to the present invention.
Figure 4:
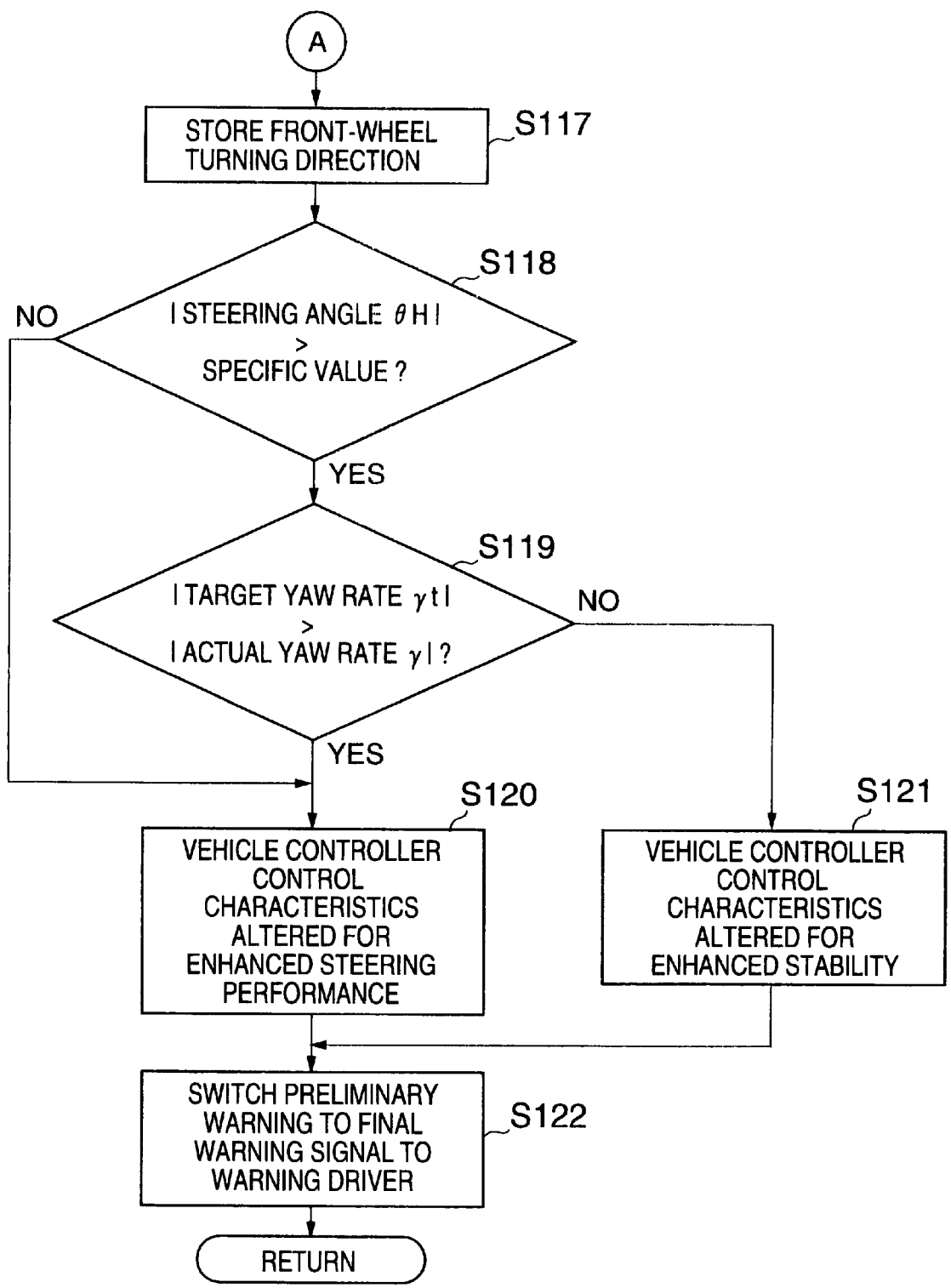
FIG. 4 shows a flowchart that follows the flowchart shown in FIG. 3.
Figure 5:
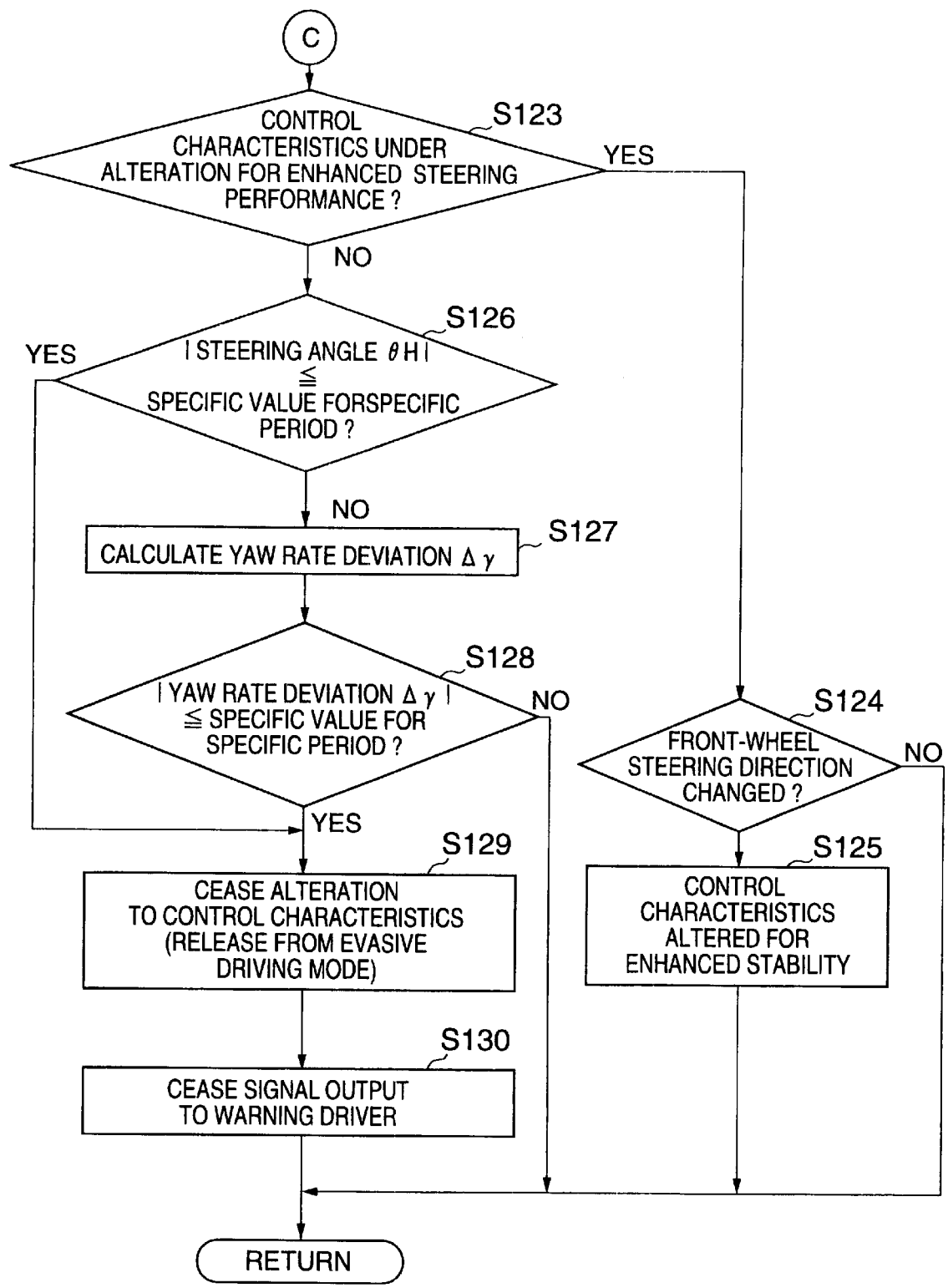
FIG. 5 shows a flowchart that follows the flowchart shown in FIG. 3.

Disclosed next is the evasive driving control performed by the evasive maneuver controller 80 in accordance with an evasive-driving control program shown in FIGS. 3 to 5, which runs per specific period.

Information on vehicle travelling conditions are read in step S101 and a target yaw rate γt is calculated according to the equation (6). It is determined is step S103 whether the vehicle 1 has entered into the evasive driving mode. The program goes to step S104 if not entered into the evasive driving mode whereas to step S123 if entered into the mode.

Disclosed first is the step S104 and the succeeding steps in which the vehicle 1 has not entered into the evasive driving mode.

Information on obstacle are read in step S104. And, it is determined is step S105 whether any obstacle (a vehicle travelling ahead) exists. The program terminates if it is determined (NO in step S105) that there is no obstacles. If not (YES in step S105), the program goes to step S106 to estimate a road friction coefficient i, and also estimate a slope of road SL (%) according to the equation (2) in step S107.

The program goes to step S108 to calculate a required deceleration distance LGB according to the equation (4), and corrects the distance LGB according to the equation (5) in step S109.

The program goes to step S110 to multiply the corrected required deceleration distance LGB by a value larger than 1 to calculate a warning deceleration distance Lwg.

The program goes to step S111 to compare the warning deceleration distance Lwg and a distance Ls to the obstacle. The program goes to step S112, if the distance Ls is longer than the distance LGB (NO in step S111), to determine whether a preliminary warning signal has been output. The program terminates if no preliminary warning signal has been output (NO in step S112). On the contrary, the program goes to step S113 to cease the preliminary warning-signal output if it has been output (YES in step S112) and terminates, due to no possibility of entering into the evasive driving mode while the distance Ls is longer than the distance Lwg.

On the contrary, the program goes to step S114 to determine whether a preliminary warning signal has been output, if the distance Ls is equal to or shorter than the distance LGB (Ls≦LGB) and it is determined that there is a possibility of entering into the evasive driving mode (YES in step S111).

The program goes to step S115 to supply the preliminary warning signal to the warning drive unit 89, if NO in step S114, to drive the warning lamp 55 so that it can flash, and the program goes to step S116. On the contrary, the program directly goes to step S116 from step S114 if the preliminary warning signal has been output (YES in step S114).

In step S116 from step S114 or S115, the corrected required deceleration distance LGB is compared with the distance Ls to the obstacle. And, the program terminates if the distance Ls is longer than the distance LGB (Ls>LGB) and it is determined that a collision with the obstacle can be avoided by the driver's braking operation only (NO in step S116).

On the contrary, the program goes to step S117 if the distance Ls is equal to or shorter than the distance LGB (Ls≦LGB) and it is determined that a collision with the obstacle cannot be avoided by the driver's braking operation only (YES in step S116). The turning direction of the front wheels in this state is stored in step S117. The program then goes to step S118.

In step S118, it is determined whether the absolute value of the steering angle θH is larger than specific value, or the steering operation has been performed. The program goes to step S119 if the absolute value of the steering angle θH is larger than the specific value and hence the steering operation has been performed (YES in step S118).

In step S119, a target yaw rate γt and an actual yaw rate γ are compared for their absolute values to determine vehicle behavior. The program goes to step S120 if the absolute value of the target yaw rate γt is larger than that of the actual yaw rate γ(|γt|>|γ|) and hence the vehicle 1 has a tendency of understeering (YES in step S119). Signals are supplied to the vehicle controllers 60, 65, 70 and 75 for altering the control characteristics thereof for enhanced steering performance.

In detail, the control characteristics of the front-rear torque-split controller 60 is altered as follows: A target yaw rate γt (absolute value) is calculated and multiplied by a coefficient larger than 1 so that it can be corrected as being larger than a usual value. This correction allows decrease in clutch torque to apply a larger torque to the rear wheels than the front wheels to achieve high steering performance.

The control characteristics of the right-left torque-split controller 65 is altered as follows: A target yaw rate γt (absolute value) is calculated and multiplied by a coefficient larger than 1 so that it can be corrected as being larger than a usual value. This correction allows a larger torque to be applied, for example, to the left wheels than the right wheels in turning right to achieve high steering performance.

The control characteristics of the rear-wheel steering controller 70 is altered as follows: A steering-angle responsive gain Kδ0 is multiplied by a rear-wheel steering-angle correction offset f1 larger than 1 to have a large absolute value for the gain Kδ0. This large absolute vale of gain Kδ0 allows the rear wheels to be steered in negative phase to the steering angle θH compared to a normal driving for enhanced steering performance. A yaw-rate responsive gain Kγ0 is multiplied by a rear-wheel steering-angle correction offset f2 smaller than 1. The gain Kγ0 is thus corrected as being smaller than a normal value in phase to the yaw rate γ for the rear wheels for enhanced steering performance.

The control characteristics of the braking force controller 75 is altered as follows: A target yaw rate γt (absolute value) is calculated and multiplied by a coefficient larger than 1 so that it can be corrected as being larger than a usual value for enhanced steering performance.

On the contrary, in step S119, the program goes to step S121 if the absolute value of the target yaw rate γt is equal to or smaller than that of the actual yaw rate γ(|γt|≦|γ|) and hence the vehicle 1 has a tendency of oversteering (NO in step S119). Signals are supplied to the vehicle controllers 60, 65, 70 and 75 for altering the control characteristics thereof for enhanced stability.

In detail, the control characteristics of the front-rear torque-split controller 60 is altered as follows: A target yaw rate γt (absolute value) is calculated and multiplied by a coefficient smaller than 1 so that it can be corrected as being smaller than the usual value. This correction allows increase in clutch torque for equal torque split to the front and rear wheels to achieve high stability.

The control characteristics of the right-left torque-split controller 65 is altered as follows: A target yaw rate γt (absolute value) is calculated and multiplied by a coefficient smaller than 1 so that it can be corrected as being smaller than the usual value. This correction allows restriction of increase in torque to be applied, for example, to the left wheels in turning right to achieve high stability.

The control characteristics of the rear-wheel steering controller 70 is altered as follows: A steering-angle responsive gain Kδ0 is multiplied by a rear-wheel steering-angle correction offset f1 smaller than 1 to have a small absolute value for the gain Kδ0. This small absolute vale of gain Kδ0 restricts the rear wheels to be steered in negative phase to the steering angle θH compared to a normal driving for enhanced stability. A yaw-rate responsive gain Kγ0 is multiplied by a rear-wheel steering-angle correction offset f2 larger than 1. The gain Kγ0 is thus corrected as being larger than the normal value in phase to the yaw rate γ for the rear wheels for enhanced stability.

The control characteristics of the braking force controller 75 is altered as follows: A target yaw rate γt (absolute value) is calculated and multiplied by a coefficient smaller than 1 so that it can be corrected as being smaller than the usual value for enhanced stability.

In step S118, if the absolute value of the steering angle θH is smaller than the specific value (NO in step S118), this indicates a possibility of a steering operation for the evasive driving. The program then goes to step S120 to supply signals to the vehicle controllers 60, 65, 70 and 75 for altering the control characteristics thereof for enhanced steering performance.

The program goes to step S122 from step S120 or S121 to supply to switch a preliminary warning signal to a final warning signal to the warning drive unit 89 to drive the warning lamp 55 so that it can be turned on to inform the driver of the evasive driving mode. The program then terminates.

Disclosed next is that step S123 and the succeeding steps to which the program goes from step S103 when determined as the evasive driving mode (YES in step S103).

In step S123, it is determined whether the current evasive driving mode is to alter the control characteristics of the vehicle controllers 60, 65, 70 and 75 for enhanced steering performance.

The program goes to step S124 if determined that the control characteristics is under alteration for each vehicle controller for enhanced steering performance (YES in step S123). It is determined in S124 whether the current front-wheel steering direction has been changed from the front-wheel steering direction stored in step S117.

The program terminates if not changed (NO in step S124) whereas goes to step S125 to switch the signals that have been supplied to the vehicle controllers 60, 65, 70 and 75 for control characteristics-alteration for enhanced steering performance to the signals for control characteristics-alteration for enhanced stability.

On the contrary, if it is determined that the control characteristics is under alteration for each vehicle controller for enhanced stability (NO in step S123), the program goes to S126. It is determined in S126 whether the absolute value of the steering angle θH has been equal to or smaller than a specific value for a specific period or more.

The program goes to step S127 if NO in step S126 to calculate a yaw rate deviation Δγ according to the equation (11). It is determined in step S128 whether the absolute value of the yaw rate deviation Δγ has been equal to or smaller than a specific value for a specific period or more. The program terminates if NO in step S128.

When at least either of the requirements in steps S126 and S128 is met, or YES in step S126 and/or S128, the program goes to step 129 to cease the signals to the vehicle controllers 60, 65, 70 and 75 for not altering their control characteristics (, or releasing the vehicle 1 from the evasive driving mode).

The program then goes to step S130 to cease the signal output to the warning driver 89 and terminates.

As disclosed above, the embodiment of the present invention offers an accurate determination of whether collision with an obstacle can be avoided by driver's braking operation only with recognition of the obstacle while analyzing information on rode such as road friction coefficient and slopes of road, and relative motion between the vehicle 1 and the obstacle.

If it is determined that collision with the obstacle cannot be avoided by driver's braking operation only, the vehicle controllers 60, 65, 70 and 75 enter into the evasive driving mode in accordance with behaviors of the vehicle 1 such as steering operations, understeering or oversteering.

Therefore, the driver can take an evasive action safely and easily based on accurate information of the obstacle.

In evasive driving, enhanced steering performance is required before avoiding collision with the obstacle whereas enhanced stability is required after passing the obstacle. The vehicle controllers 60, 65, 70 and 75 of the embodiment appropriately operate during the evasive driving mode with determination of how these requirements are met based on steering operations and vehicle behaviors.

The vehicle equipped with the vehicle controlling apparatus according to the embodiment can be released from the evasive driving mode at an exact timing with detection of the completion of driver's evasive maneuvering or vehicle stability after the evasive maneuvering.

Moreover, the vehicle controlling apparatus according to the embodiment gives a preliminary warning to the driver before entering into the evasive driving mode at a good timing for taking information on the obstacle so that the driver can recognize a possibility of change in vehicle behaviors, and also gives final warning to the driver following to the preliminary warning on entering into the evasive driving. This double-warning mechanism offers the driver with accurate vehicle-behavior information in evasive driving so that the driver can maneuver drive the vehicle appropriately in accordance with the vehicle behaviors.

The vehicle controlling apparatus according to the embodiment is equipped with the pair of CCD cameras 51R and 51L for image processing in detection of obstacles existing ahead. Not only that, however, ultrasonic radar or laser system, etc., can be used for obstacle detection.

Furthermore, the vehicle controlling apparatus according to the embodiment is equipped with the vehicle controllers such as the front-rear torque-split controller 60, the right-left torque-split controller 65, the rear-wheel steering controller 70 and the braking force controller 75. These controllers operate in response to the control signals from the evasive maneuver controller 80. The present invention can, however, be applied to any system in which at least any one of the vehicle controllers operates under the evasive maneuver controller 80.

In this embodiment, each parameter such as the target yaw rate, steering responsive gain and yaw rate responsive gain for the vehicle controllers 60, 65, 70 and 75 is corrected to be increased (or decreased) for its absolute value by multiplying it by a coefficient larger (or smaller) than 1. However, any other correction techniques can be applied.

The front-rear torque-split controller 60 uses the target yaw rate as a correction parameter. Any other parameter can, however, be used under the requirement that an engagement torque to the transfer clutch 21 be set for torque split in which a larger torque will be transmitted to the rear wheels than the front wheels for enhanced steering performance whereas an equal torque will be transmitted to the front and rear wheels enhanced high stability.

The target yaw rate is also used for the right-left torque-split controller 65 as a correction parameter. Any other parameter can, however, be used under the requirement that the correction be performed so that a larger steering torque can be transmitted, for example, to the left wheels or a larger braking force can be transmitted to the right wheels in turning right for enhanced steering performance under determination that the vehicle has a high tendency of understeering in relation to the reference steering characteristics; or a larger steering torque can be transmitted, for example, to the right wheels or a larger braking force can be transmitted to the left wheels in turning right for enhanced stability under determination that the vehicle has a low tendency of understeering or oversteering in relation to the reference steering characteristics.

The control protocol installed in the rear-wheel steering controller 70 in this embodiment is the control protocol with negative-phase steering angle and in phase yaw rate. Not only that, a known protocol such as the yaw-rate feed-back control protocol or the front-wheel steering-angle proportional control protocol can be applied. The requirements of correction under any control protocol are that the steering angle for the rear wheels be corrected in negative phase against the front wheels with decreasing the steering angle for the rear wheels in phase to the front wheels for enhanced steering performance; or the steering angle for the rear wheels be corrected in phase to the front wheels with decreasing the steering angle for the rear wheels in negative phase against the front wheels for enhanced stability.

Not only as already described, the braking force controller 75 may perform braking-force control such that a large target yaw rate is applied to increase a braking force for enhanced steering performance under determination that the vehicle has a high tendency of understeering in relation to the reference steering characteristics; or a large target yaw rate is applied to increase a braking force for enhanced stability under determination that the vehicle has a low tendency of understeering or oversteering in relation to the reference steering characteristics.

The warning lamp 55 in this embodiment offers the driver with a preliminary warning and also a final warning. This double-warning mechanism is achieved with two or more warning lamps or a combination of known devices using voice, buzzer and chime, etc.

As disclosed above, the vehicle controlling apparatus according to the present invention achieves evasive driving appropriately with the vehicle controllers in cooperation with each other controlling several vehicle behaviors with precise recognition of obstacles and analysis of various travelling conditions.

Moreover, the vehicle controlling apparatus according to present invention offers the driver with information on vehicle behaviors in evasive driving so that the driver can make any decision and maneuver the vehicle in accordance with the vehicle behaviors.

What is claimed is:

1. A vehicle controlling apparatus installed in a vehicle comprising:
    an obstacle recognizer to recognize an obstacle existing ahead of the vehicle for detecting information on the obstacle;
    a vehicle information detector to detect information on travelling conditions of the vehicle;
    a vehicle controller to change steering performance of the vehicle for controlling behaviors of the vehicle;
    an evasive-driving determiner to determine whether the vehicle can avoid collision with the obstacle only by a driver's braking operation based on at least the information on the obstacle and the vehicle;
    an evasive-driving controller to control the vehicle controller to enter into an evasive driving mode in accordance with a driver's steering operation and the vehicle behaviors when it is determined that the vehicle cannot avoid collision with the obstacle only by the driver's braking operation and also control the vehicle controller to change a control operation of the vehicle controller in the evasive driving mode in accordance with the driver's steering operation and the vehicle behaviors;
    a preliminary informer to give a preliminary information to the driver to indicate that the vehicle controller will enter into the evasive driving mode; and
    a final informer to inform the driver that the vehicle controller has entered into the evasive driving mode.

2. The apparatus according to claim 1, wherein the evasive-driving determiner compares a first distance between the vehicle and the obstacle and a reference distance that is longer than a second distance that is enough for the vehicle to avoid collision with the obstacle only by the driver's braking operation, based on the information on the obstacle and the vehicle, the preliminary informer giving the preliminary information to the driver if the first distance is equal to or shorter than the reference distance.

3. The apparatus according to claim 1, wherein the evasive-driving controller controls the vehicle controller to achieve high steering performance compared to normal driving in a first mode of the evasive driving mode or achieve high stability compared to the normal driving in a second mode of the evasive driving mode.

4. The apparatus according to claim 3, wherein the evasive-driving controller switches the vehicle controller from the first to the second mode when a steering direction of the vehicle has been changed in the first mode.

5. The apparatus according to claim 1, wherein the evasive-driving controller releases the vehicle from the evasive driving mode when it is determined that a degree of the driver's steering operation has been low for a specific period or longer and/or a deviation of an actual yaw rate from a target yaw rate has been within a predetermined range for a specific period or longer.

6. The apparatus according to claim 1 further comprising an estimator to estimate conditions of a road on which the vehicle is travelling, the evasive-driving determiner determines whether the vehicle can avoid collision with the obstacle only by the driver's braking operation based on the information on the obstacle and the vehicle and the estimated road conditions.

7. The apparatus according to claim 1 wherein the vehicle includes at least a braking force controller to apply a braking force to at least one of front, rear, right and left wheels of the vehicle selected based on the travelling conditions of the vehicle, a rear-wheel steering controller to steer at least one of the rear wheels of the vehicle in accordance with the travelling conditions of the vehicle, a front-rear torque-split controller to control torque split to the front and rear wheels or a right-left torque-split controller to control torque split to the right and left wheels.

8. A vehicle controlling method comprising the steps of:
    recognizing an obstacle existing ahead of a vehicle to detect information on the obstacle;
    detecting information on travelling conditions of the vehicle;
    changing steering performance of the vehicle for controlling behaviors of the vehicle;
    determining whether the vehicle can avoid collision with the obstacle only by a driver's braking operation based on at least the information on the obstacle and the vehicle;
    entering into an evasive driving mode in accordance with a driver's steering operation and the vehicle behaviors when it is determined that the vehicle cannot avoid collision with the obstacle only by the driver's braking operation;
    changing the steering performance of the vehicle in the evasive driving mode in accordance with the driver's steering operation and the vehicle behaviors;
    giving a preliminary information to the driver to indicate that the vehicle will enter into the evasive driving mode; and
    informing the driver that the vehicle has entered into the evasive driving mode.

9. The apparatus according to claim 8, wherein the collision avoiding determining step includes the step of comparing a first distance between the vehicle and the obstacle and a reference distance that is longer than a second distance that is enough for the vehicle to avoid collision with the obstacle only by the driver's braking operation, based on the information on the obstacle and the vehicle, and the preliminary-information giving step includes the step of giving the preliminary information to the driver if the first distance is equal to or shorter than the reference distance.

10. The method according to claim 8 further comprising the step of controlling the vehicle to achieve high steering performance compared to normal driving in a first mode of the evasive driving mode or achieve high stability compared to the normal driving in a second mode of the evasive driving mode.

11. The method according to claim 10 further comprising the step of switching the first mode to the second mode when a steering direction of the vehicle has been changed in the first mode.

12. The method according to claim 8, wherein the releasing step includes the step of releasing the vehicle from the evasive driving mode when it is determined that a degree of the driver's steering operation has been low for a specific period or longer and/or a deviation of an actual yaw rate from a target yaw rate has been within a predetermined range for a specific period or longer.

13. The method according to claim 8 further comprising the step of estimating conditions of a road on which the vehicle is travelling, for determination of whether the vehicle can avoid collision with the obstacle only by the driver's braking operation based on the information on the obstacle and the vehicle and the estimated road conditions.

14. The method according to claim 8 wherein the steering performance-changing step includes at least the step of applying a braking force to at least one of front, rear, right and left wheels of the vehicle selected based on the travelling conditions of the vehicle, steering at least one of the rear wheels of the vehicle in accordance with the travelling conditions of the vehicle, controlling torque split to the front and rear wheels or controlling torque split to the right and left wheels.

* * * * *